United States Patent [19]

Toma et al.

[11] Patent Number: 5,030,125
[45] Date of Patent: Jul. 9, 1991

[54] ATTACHMENT ASSEMBLY FOR ULTRAVIOLET LIGHT LAMP APPARATUS

[75] Inventors: Kiyomitsu Toma, Torrance; Kenneth Lew, Saugus, both of Calif.

[73] Assignee: Aquafine Corporation, Valencia, Calif.

[21] Appl. No.: 414,951

[22] Filed: Sep. 29, 1989

[51] Int. Cl.⁵ .......................................... H01R 33/08
[52] U.S. Cl. .................................. 439/226; 439/235; 313/51
[58] Field of Search ................ 313/49, 50, 51, 318; 439/226, 230, 234, 235, 236, 237, 239, 242, 320, 611, 612, 613

[56] References Cited

U.S. PATENT DOCUMENTS

| | | | |
|---|---|---|---|
| 2,320,170 | 5/1943 | Bishop et al. | 313/50 |
| 3,426,234 | 2/1969 | Hayasaka et al. | 439/226 X |
| 4,092,706 | 5/1978 | Vest | 439/237 X |
| 4,753,603 | 6/1988 | Hafstad | 439/226 |
| 4,842,534 | 6/1989 | Velke, Sr. et al. | 439/226 X |

Primary Examiner—Larry I. Schwartz
Assistant Examiner—Khiem Nguyen
Attorney, Agent, or Firm—Lyon & Lyon

[57] ABSTRACT

An attachment assembly for each end of an ultraviolet light lamp positioned in a quartz sleeve protruding through a mounting nipple on opposite ends of an apparatus such as a water treatment unit. A compression nut is threadly mounted on each of the mounting nipples and has an internal cylindrical bore with an O-ring for receiving and positioning the end of the quartz sleeve. An elastic electrical socket assembly is operably connected to each end of the ultraviolet light lamp. A retainer is detachably mounted on the compression nut and has means for retaining the electrical socket assembly in position. A compression spring is provided in one of the retainers to resiliently urge the electrical socket assemblies into engagement with the ends of the lamp continuously and securely.

29 Claims, 1 Drawing Sheet

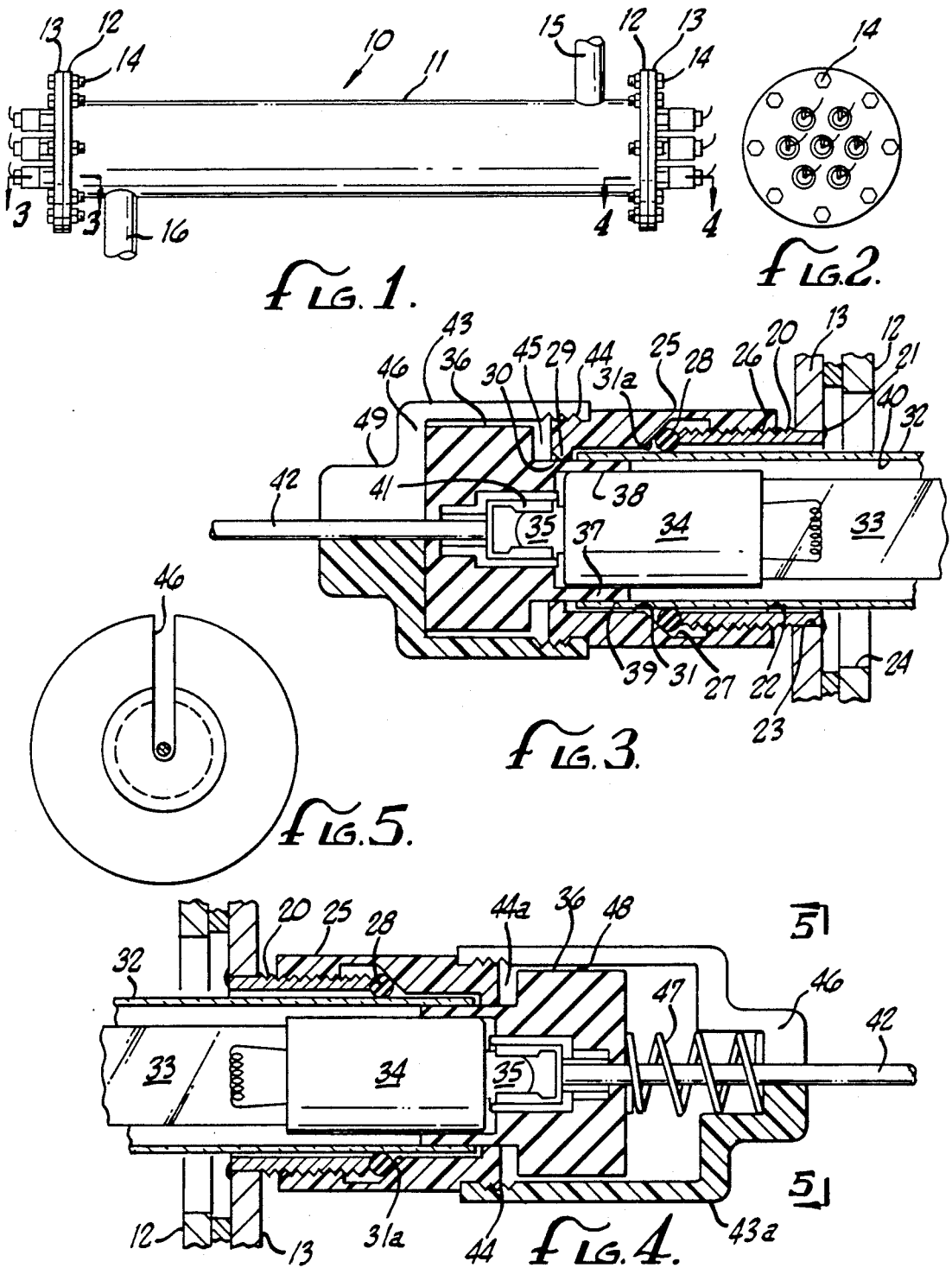

ATTACHMENT ASSEMBLY FOR ULTRAVIOLET LIGHT LAMP APPARATUS

This invention relates to an attachment assembly for mounting an elongated tube-type ultraviolet light lamp in an apparatus, and making the electrical connection at both ends of the ultraviolet light lamp, and, in particular, for mounting a plurality of ultraviolet light lamps within quartz tubes in an apparatus such as a water disinfecting unit or the like.

The use of ultraviolet light for the treatment of water and other fluids has been well known and a typical ultraviolet apparatus will comprise an elongated chamber for the water to pass through and one or more tubular quartz sleeves extending through the chamber with the water passing around the outside of the quartz sleeves and the ultraviolet light lamps positioned within the quartz sleeves for separating the lamps from contact with the water. A conventional ultraviolet light lamp (hereafter "UV lamp") of the tube-type does not have a threaded electrical connector on each end similar to a conventional light bulb, but rather a pin extends from the end of each lamp base which plugs into an elastic socket or boot having an electrical contact for the pin. The UV lamp device is subjected to vibration and shocks due to the flowing water and changes in the rate of flow (so-called "water hammer"), as well as the proximity of related equipment that vibrates, such as pumps. As a result, it is a common problem for the elastic socket assembly to become loosened from the end of the UV lamp and to then cause arcing between the UV lamp and the electrical contacts in the socket assembly which in turn can cause fires and other damage. Even if arcing does not occur, the socket assembly can become disconnected to allow one or more UV lamps to be off, thereby greatly affecting the ultraviolet treating capacity of the apparatus, and yet it may not be noticed that one or more UV lamps are disconnected.

Further, it is common for ultraviolet light treatment units to be of substantial length, such as four to six feet or even longer, whereby it is impossible for one person to reach both ends of the UV lamp to simultaneously install the elastic socket assembly on each end of the UV lamp. Since the UV lamp is movably supported in the quartz sleeve, either the electrical socket assembly may not be properly and completely installed if done by one person or it requires a person at each end of the treatment unit to install the elastic lamp socket assembly simultaneously. Even with two persons installing the socket assemblies, the installation is not easy in view of the close spacing among the multiple UV lamps used in larger units whereby installation of the plugs may not be completely secure.

It is an object of the present invention to provide an attachment assembly for each end of a conventional UV lamp of the tube-type that will ensure a secure electrical connection to the UV lamp regardless of adverse environmental conditions.

Another object of the present invention is to provide an attachment assembly for each end of a conventional UV lamp of the tube-type which provides an affirmative but resilient force for maintaining the electrical connection at each end of the ultraviolet light without any potential damage to the UV lamp.

A still further object of the present invention is to provide an attachment assembly for each end of a conventional UV lamp of the tube-type for supporting and mounting the UV lamp in a quartz sleeve and wherein it is unnecessary to reach both ends of the UV lamp tube simultaneously for installing the attachment assembly. Further objects and advantages of this invention will be apparent to those skilled in the art from the following description and the accompanying drawings, wherein:

FIG. 1 is a side elevation view of a typical ultraviolet light treatment unit having a multiplicity of ultraviolet light lamps in which the attachment assembly of the present invention is employed;

FIG. 2 is an end view of the sterilizer unit of FIG. 1 showing an array of seven ultraviolet light lamps;

FIG. 3 is an enlarged fragmentary sectional view taken substantially on the line 3—3 in FIG. 1 and illustrating the attachment assembly of this invention at one end of the treatment unit;

FIG. 4 is a fragmentary sectional view taken substantially on the line 4—4 in FIG. 1 showing the attachment assembly of this invention on the other end of the treatment unit; and FIG. 5 is an end view taken substantially on the line 5—5 in FIG. 4.

A preferred embodiment of the present invention will be described in connection with a typical water treatment unit using conventional UV lamps but it will readily appear to those skilled in the art that the invention is equally applicable to other types of apparatus and other uses.

Referring now to FIGS. 1 and 2, a typical water treatment unit 10 includes a cylindrical casing 11 having flanges 12 permanently connected to each end, such as by welding, and flanges 13 removably connected at both ends by a plurality of bolts 14 to close the ends of the chamber. The flanges 12 and 13 are shown as circular but may also be square or rectangular. The casing 11 has an inlet pipe 15 connected at one end and an outlet pipe 16 connected at the other end for circulating water through the chamber formed by the casing 11 from inlet pipe 15 to outlet pipe 16. As an example of a typical treatment unit, as shown in FIG. 2, an evenly distributed pattern of seven ultraviolet light lamps are provided and extend the entire length of the unit 10 with the UV lamps emerging beyond the flanges 13 on each end. Conventional treatment units may have more or fewer than seven UV lamps, depending on the size and intended use, arranged in any desired patern.

Referring now to FIG. 3, which illustrates the attachment assembly of this invention for one end of the UV lamp, a threaded nipple 20 is attached to the 13 by any convenient means such as welding 21 with the internal bore 22 of mounting nipple 21 substantially aligned with a hole 23 in the flange 13. The flange 12 also has a larger hole 24 substantially aligned with bore 22 and hole 23 when flange 13 is mounted on flange 12 or flange 12 may be just an annular ring with an inside diameter approximately equal to the inside diameter of cylinder 11. A compression unit 25 is removably mounted on nipple 20 such as by matching thread means 26 provided on the nut and nipple. An internal groove 27 in compression nut 25 is adapted to receive an elastic O-ring 28. The outer end of compression nut 25 is provided with an inwardly extending flange portion 29 with a central bore 30. Between flange portion 29 and internal groove 27, the compression nut 25 is provided with an intermediate sized internal bore 31.

The compression nut 25 is provided for supporting and positioning the end of a quartz sleeve or tube 32 which extends the entire length of the unit 10 and has its other end supported by the assembly shown in FIG. 4, as will be described below. The O-ring 28 tightly engages the exterior surface of the quartz sleeve 32 to support the quartz sleeve and, in addition, is compressed by the tapered surface 31a between bore 31 and groove 27 to serve as a seal to maintain the water inside of the cylindrical casing 11 of the unit 10, with the water pressure communicating with the O-ring 28 through the holes 24 and 23 and the bore 22 in mounting sleeve 20.

A conventional UV lamp 33 has a cylindrical base portion 34 and electrical contact pin 35 extending from the end of the base portion 34. An electrical lamp socket assembly 36, sometimes referred to as a "boot," of an elastic material has a neck portion 37 with an internal diameter 38 of a size to tightly fit on the base portion 34 of the UV lamp 33. The wall thickness of neck portion 37 is such that when the neck portion 37 is installed on the base portion 34 of the UV lamp 33, as shown in FIG. 3, the external cylindrical surface 39 of the neck portion 37 snugly fits within the internal bore 40 of the quartz sleeve 32 and in the bore 30 of the flange portion 29 of the positioning sleeve 25 to center the UV lamp 33 within the quartz sleeve 32. By centering the UV lamp within the quartz sleeve 32 at each end, the attachment assembly of this invention prevents the tube of the UV lamp 33 from contacting the inside of the quartz sleeve 32 which would cause excessive cooling of the UV lamp by the circulating water which in turn causes premature failure of the UV lamp and ballast because the ballast will continually supply the higher "starting" voltage to the cooled UV lamp.

The internal bore 38 of the neck portion 37 of the socket assembly 36 forms a water-proof seal for the lamp socket electrical contact with the UV lamp base portion 34 and an electrical contact 41 in the base of the connector 36 engages the pin 35 of the UV lamp 33. An electrical wire 42 extends from the center of the end of the elastic socket assembly 36 for supplying electricity to the UV lamp 33.

A lamp socket retainer 43 is mounted over the elastic socket assembly 36 and attaches to the compression nut 25 by any convenient means such as thread means 44 to retain the socket assembly 36 in its described position regardless of vibrations, shocks, pressure differentials or the like. The axial length of the body portion of socket assembly 36 (i.e., the portion extending outwardly from the neck portion 37) preferably is slightly shorter than the axial length of the chamber portion of retainer 43 containing the connector 36 when the retainer 4 is completely installed to allow a small axial space 45 in the assembled condition. Similarly, the internal bore 31 of compression unit 25 is slightly larger than the external diameter of quartz sleeve 32 to provide an annular space there-between for insuring that the quartz sleeve 32 is resiliently supported by the O-ring 28 and the neck portion 37 of the elastic electrical connector 36. The retainer nut 43 has a radial slot 46 (see FIG. 5) which allows the retainer 43 to be installed laterally over the wire 42 and then moved axially into engagement with the thread means 44. The compression nut 25 and retainer 43 preferably are of a plastic or other electrical non-conducting material to avoid any electrical shorts.

Referring now to FIG. 4, many of the components of the attachment assembly of this invention and their functions are identical to those described above with respect to FIG. 3 whereby such components are identified by the same number and will not be described in detail again. Again, the compression nut 25 is threadly mounted on the nipple 20 which in turn is fixed to the flange 13 on this end of the unit 10. The elastic socket assembly 36 is installed o the base portion 34 of the UV lamp 33 and fits within the quartz sleeve 32, as described above. The socket retainer 43a is of a longer axial length but is threadly engaged on the compression nut 25 by thread means 44 in the same manner as described above. A coil compression spring 47 is provided in the enlarged chamber at the rear of retainer 43a. The compression spring 47 resiliently urges the socket assembly 36 toward the end of the UV lamp 33. The outside diameter of the socket assembly 36 is smaller than the inside diameter of the chamber in which it fits in retainer 43a to provide a small annular space 48 whereby the socket assembly 36 is resiliently movable within the retainer 43a. Retainer 43a also is provided with a radial slot 46 for allowing lateral installation thereof over the wire 42 and then axial advancement of the retainer 43a into threaded engagement with the compression nut 25 during assembly.

The method of using the attachment assembly of the present invention will now be described with respect to the water sterilizer unit 10. The two flanges 13 are installed on the two flanges 12 by bolts 14. With the compression nuts 25, retainers 43 and socket assemblies 36 removed from both ends of the unit, the quartz sleeves 32 are installed in each of the openings formed by the threaded nipples 20. A compression nut 25 with the O-ring 28 in groove 27 is then installed on the same end (left end shown in FIG. 1) of each quartz sleeve 32 and threadly engaged on the nipple 20. An elastic socket assembly 36 is then installed on the base portion 34 of a UV lamp 33 and the lamp is inserted into the quartz sleeve until the neck portion 37 of the electrical connector 36 snugly fits into the quartz sleeve 32 and bore 30 of the flanged portion 29 of compression nut 25. A retainer 43 is slipped over the wire 42 and moved axially toward and threadly engaged on the compression nut 25. A finger knob 49 is provided on the end of each retainer 43 for conveniently gripping each retainer 43 for installing or removing same. In view of the close spacing of the plurality of UV lamps it would be difficult to grip the retainer 43 without the reduced-sized knob 49, particularly for any lamps located inside the outer circle of lamps such as the center lamp shown in FIG. 2.

With all of the components of the attachment assembly installed on all of the UV lamps at one end of the unit 10, such as shown in FIG. 3, the installer may then install the attachment assemblies on the opposite end without anyone remaining at the first end. The quartz sleeves 32 extend beyond the ends of the nipples 20 and a compression nut 25 with the O-ring 28 is installed over the end of each quartz sleeve. The base portion 34 of each UV lamp 33 protrudes beyond the compression nut 25 to permit an elastic socket assembly 36 to be installed on the base portion 34 and simultaneously to be inserted into the internal bore of the quartz sleeve 32 and bore 30 of the flanged portion 29 of the compression nut 25. Before electrically connecting the wire 42 to the source of electricity, the compression spring 47 is threaded over the wire 42 to a position behind the socket assembly 36. The retained 43a is then installed laterally over the wire 42 through the slot 46 and advanced axially to receive the compression spring 47 and electrical connector 36 before threading onto the compression nut 25. The compression spring 47 is compressed during this threaded engagement to thereby impose a resilient axial force on the back of socket assembly 36 toward the UV lamp 33. With both of the elastic socket assemblies 36 completely installed and making solid electrical contact with the pins 35 on UV lamp 33, the lengths of the cylinder 11, quartz sleeve 32, lamps 33 and socket assemblies 36 are so selected as to leave a gap 44a within retainer 43a between the connector 36 and the end of compression nut 25 and a gap 44 at the same location within retainer 43, as shown in FIGS. 4 and 3, respectively. The resilient force of compression spring 47 continually maintains assembly of the elastic socket assemblies 36 on both ends of the UV lamp 33 in spite of any vibrations occurring in the unit 10 or other factors which have caused disconnection of the electrical socket assemblies or boots in prior art apparatus of this type. Similarly, the lengths of cylinder 11, quartz sleeve 32 and compression nuts 25 are so selected as to leave gaps between the ends of the quartz sleeves 32 and the inward flanges 29 to allow different thermal expansion rates of the components but the flanges 29 do maintain the quartz sleeve 32 within the unit.

In the event maintenance of the unit is required, such as the replacement of a burnt out UV lamp 33, the retainer 43 or 43a at either end, whichever is more convenient, of the unit 10 is threadly released from the compression nut 25, moved axially rearwardly to expose the socket assembly 36, and then moved laterally with the wire 42 passing through the slot 46 if it is desired to completely remove the retainer 43 or 43a from the unit. The elastic socket assembly 36 is then removed from the base portion 34 of that end of the UV lamp 33 to expose the end of the UV lamp 33, which lamp may then be removed from the quartz sleeve 32 by pulling it axially. A new UV lamp is then inserted into the quartz sleeve 32 and pushed with sufficient force to be slidably inserted into the neck portion 38 of the elastic socket assembly 36 that remained assembled to the opposite end of the unit 10. The electrical connector 36 is then reassembled to the exposed end of the UV lamp 33 and the retainer 43 or 43a (with spring 47) is reinstalled.

While the invention has been described in connection with a preferred embodiment of the attachment assembly for use on a water treatment unit of a particular configuration, it will readily appear to those skilled in the art that the invention is equally applicable to other devices for other uses wherein a problem exists of maintaining an electrical connection at the end of a UV lamp or the like that does not employ a threaded connection or wherein the two ends of a UV lamp or the like are separated by a distance which otherwise requires two people for installing connectors at each end simultaneously.

I claim:

1. An attachment assembly for the end of an ultraviolet light lamp positioned in and movable relative to a quartz sleeve protruding through and movable relative to a nipple fixedly mounted on and extending from an enclosed apparatus subject to internal pressure, comprising: a compression nut for detachably mounting on the nipple in sealing relationship and having an internal cylindrical bore smaller than an internal bore of the nipple for receiving and positioning the end of the quartz sleeve; an electrical socket assembly for operably receiving and electrically connecting to the end of the ultraviolet light lamp; and a retainer for detachably mounting on the compression nut and having means for retaining the electrical socket assembly in position.

2. The attachment assembly of claim 1, wherein said compression nut has a groove for receiving an O-ring, said O-ring sealably engaging and supporting the quartz sleeve.

3. The attachment assembly of claim 1, wherein said compression nut includes an inwardly extending flange for axially retaining the quartz sleeve in the apparatus.

4. The attachment assembly of claim 1, wherein said electrical socket assembly has a neck portion for inserting into the quartz sleeve in fitting relationship.

5. The attachment assembly of claim 1, wherein said retainer has a chamber for closely confining said electrical socket assembly.

6. The attachment assembly of claim 5, wherein said chamber is of slightly larger axial and radial size than said electrical socket assembly for allowing limited movement of said electrical socket assembly within said compression nut.

7. The attachment assembly of claim 1, wherein said retainer has a chamber for receiving said electrical socket assembly, said chamber having an axial length substantially longer than said electrical socket assembly, and resilient means in said chamber urging said electrical socket assembly toward the lamp.

8. The attachment assembly of claim 7, wherein said electrical socket assembly is axially slidable within said chamber.

9. The attachment assembly of claim 1, wherein said retainer is threadly connected to said compression nut.

10. The attachment assembly of claim 1, wherein said electrical socket assembly has an elastic neck portion for resiliently engaging and gripping the lamp.

11. The attachment assembly of claim 1, wherein said retainer has a knob portion extending away from the apparatus, said knob portion being of a smaller diameter than the rest of the retainer for ease of manual gripping.

12. An attachment assembly for the end of an ultraviolet light lamp positioned in a quartz sleeve protruding through a nipple on an apparatus, comprising: a compression nut for detachably mounting on the nipple and having an internal cylindrical bore for receiving and positioning the end of the quartz sleeve; an electrical socket assembly for operably receiving the end of the ultraviolet light lamp; and a retainer for detachably mounting on the compression nut and having means for retaining the electrical socket assembly in position; wherein said electrical socket assembly has an electrical wire extending axially from the center of an end of the electrical socket assembly away from the lamp for supplying electricity to the lamp, and said retainer has a radial slot for allowing the retainer to be installed on and removed from the wire laterally without disconnecting the wire from an electrical source.

13. The attachment assembly of claim 12, wherein said compression nut has a groove for receiving an O-ring, said O-ring sealably engaging and supporting the quartz sleeve.

14. The attachment assembly of claim 12, wherein said compression nut includes an inwardly extending flange for axially retaining the quartz sleeve in the apparatus.

15. The attachment assembly of claim 12, wherein said electrical socket assembly has a neck portion for inserting into the quartz sleeve in fitting relationship.

16. The attachment assembly of claim 12, wherein said retainer has a chamber for closely confining said electrical socket assembly.

17. The attachment assembly of claim 16, wherein said chamber is of slightly larger axial and radial size than said electrical socket assembly for allowing limited movement of said electrical socket assembly within said compression nut.

18. The attachment assembly of claim 12, wherein said retainer has a chamber for receiving said electrical socket assembly, said chamber having an axial length substantially longer than said electrical socket assembly, and resilient means in said chamber urging said electrical socket assembly toward the lamp.

19. The attachment assembly of claim 18, wherein said electrical socket assembly is axially slidable within said chamber.

20. The attachment assembly of claim 12, wherein said retainer is threadedly connected to said compression nut.

21. The attachment assembly of claim 12, wherein said electrical socket assembly has an elastic neck portion for resiliently engaging and gripping the lamp.

22. The attachment assembly of claim 12, wherein said retainer has a knob portion extending away from the apparatus, said knob portion being of a smaller diameter than the rest of the retainer for ease of manual gripping.

23. An attachment assembly for the ends of an ultraviolet light lamp positioned in and movable relative to a quartz sleeve protruding through and movable relative to nipples fixedly mounted and extending from opposite ends of an enclosed apparatus subject to internal pressure, comprising: a nut means for detachably mounting on each of the nipples in sealing relationship and having an internal cylindrical bore smaller than the internal bore of the nipple for receiving and positioning the end of the quartz sleeve; an electrical socket means for each end of the lamp and having means for operably receiving and electrically connecting to the end of the lamp; a retainer means for detachably mounting on each of the nut means and having means for retaining the electrical socket means in position therein; and a resilient means mounted in at least one of said retainer means for urging the electrical socket means therein in an axial direction toward the lamp for maintaining said electrical connection.

24. The attachment assembly of claim 23, wherein said electrical socket means are axially movable within each said retainer means and said resilient means maintains said electrical socket means connected to the ends of the lamp.

25. The attachment assembly of claim 23, wherein one of said retainer means is axially longer than the other, and said resilient means comprises a compression spring positioned in said longer retainer means and engaging an axial end of a said electrical socket means.

26. The attachment assembly of claim 23, wherein the apparatus, lamp, quartz sleeve, nipples, nut means, positioning electrical socket means and retainer means have respective axial lengths for providing axial spaces for allowing axial movement of said assembled lamp and electrical socket assemblies resiliently urged in one direction by said resilient means.

27. The attachment assembly of claim 26, wherein said quartz sleeve is axially movable for a small distance limited, by said nut means.

28. An attachment assembly for the end of a lamp positioned in and movable relative to a sleeve protruding through and movable relative to a mounting nipple fixedly mounted on an enclosed apparatus subject to internal pressure, comprising: an electrical means having a socket for operably receiving and electrically connecting to the end of the lamp; and means for detachably mounting on the mounting nipple in sealing relationship and having means for retaining said electrical means electrically connected to the lamp and retaining the sleeve in position in the apparatus.

29. The attachment assembly of claim 28, wherein said means for detachably mounting on the mounting nipple includes resilient means for continually and resiliently urging said electrical means into engagement with the lamp for maintaining said electrical connection.

* * * * *